K. TAKASHIMA.
METHOD FOR MAKING SPONGE BALLS.
APPLICATION FILED FEB. 19, 1919.
1,402,682.
Patented Jan. 3, 1922.
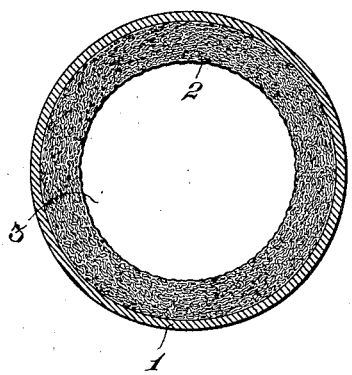
Witnesses.
Den Kido
Eishira Abe
Inventor.
Kingo Takashima

UNITED STATES PATENT OFFICE.

KINGO TAKASHIMA, OF TOKYO-FU, JAPAN, ASSIGNOR TO TAKASAGO GOMU KABUSHIKI KWAISHA, OF TOKYO-FU, JAPAN.

METHOD FOR MAKING SPONGE BALLS.

1,402,682. Specification of Letters Patent. Patented Jan. 3, 1922.

Application filed February 19, 1919. Serial No. 277,943.

*To all whom it may concern:*

Be it known that I, KINGO TAKASHIMA, a subject of the Empire of Japan, residing at No. 1000 Oh-Aza Zoshigaya, Takata-Mura, Kitatoshima-Gun, Tokyo-Fu, Japan, have invented a certain new and useful Method for Making Sponge Balls, of which the following is a specification.

My invention relates to a sponge ball characterized by the construction that the shell made of common rubber ball has an inner liner of spherical spongy rubber zone of suitable thickness, and that the ball forms a hollow central space therein, and has for its object to provide a new and useful ball durable for a long use and suitable to be used especially as a substitute for the tennis ball in the relation of its weight and resiliency.

The accompanying drawing shows a section of this sponge ball of my invention.

Referring to the drawing, the spherical spongy rubber zone 2 of suitable thickness is adhered to the interior of a spherical shell 1 consisting of the same quality as common rubber ball, and the ball forms a hollow central space 3, and the said hollow space is punctured as by forming a small hole so as to communicate with the atmosphere.

The following is a process of manufacturing the sponge ball:—

A petal-shaped piece of spongy rubber element is affixed as by adhesion to the interior of a similarly shaped piece of rubber element consisting of the same quality as common rubber ball, and then several of the adhered pieces are joined together in turn so as to form a hollow body. The said hollow body is put in a spherical mould and is heated under a suitable temperature, and after a while its inner and outer rubber zones are caused to vulcanize, and at the same time a ball is formed to come in contact with the interior of the mould under the tension of ammonia gas, etc. The ball, thus obtained, is removed from the mould, and by means of a fine hole perforated through a part of its shell or by other suitable means, the ammonia gas, etc., in the ball is exhausted and the air takes the place thereof, so that the hollow space in the ball is communicated to the atmosphere, thus the ball keeps its spherical shape by the elasticity of the shell itself.

This invention has the characteristic feature of giving resiliency to the ball by the elasticity of the shell itself as mentioned above, and is quite different from the common rubber ball which keeps its resiliency by the action of the compressed air filled therein. Thus the present ball can preserve its resiliency and keep its original shape for a long use even if a part of the shell is worn or broken, and also there is not so much danger of damage owing to the change of its inner pressure which happens usually in the common air ball, therefore the present ball is suitable to be exported abroad. Further, if the thickness of the spongy rubber zone is selected suitably, it is possible to manufacture a ball similar, in its weight and resiliency, to the tennis ball having a cover of leather or linen. Furthermore, as the present ball is manufactured mechanically by a mould, it can be obtained more simply and economically as compared with the common tennis ball which is sewed together with the leather or linen cover by hand work one by one, and also it has durability, so that the ball can be used effectively as a substitute for the tennis ball.

I claim:

The process of making a hollow ball composed of a plurality of petal-shaped pieces of imperforate rubber and a plurality of correspondingly-shaped pieces of sponge rubber, consisting in first securing the sponge pieces to the inner faces of the imperforate pieces of rubber by adhesion, joining the several pieces of secured imperforate and sponge rubber together to form a hollow body with the imperforate rubber pieces disposed outwardly; applying heat to the hollow body to vulcanize the imperforate and sponge rubber and to unite the petal-shaped pieces of imperforate rubber, and finally perforating the outer imperforate piece.

In testimony whereof I have affixed my signature in presence of two witnesses.

KINGO TAKASHIMA.

Witnesses:
DEN KIDO,
EISHIRO ABE.